United States Patent [19]

Dijkshoorn et al.

[11] 4,366,181

[45] Dec. 28, 1982

[54] FAT BLEND SUBSTANTIALLY FREE OF HYDROGENATED AND INTERESTERIFIED FATS

[75] Inventors: Willem Dijkshoorn, Vlaardingen; Hindrik Huizinga, Maassluis; Jacobus N. Pronk, Vlaardingen, all of Netherlands

[73] Assignee: Lever Brothers Company, New York, N.Y.

[21] Appl. No.: 267,231

[22] Filed: May 26, 1981

[30] Foreign Application Priority Data

May 30, 1980 [NL] Netherlands ................. 8003144

[51] Int. Cl.³ .............................................. A23D 3/00
[52] U.S. Cl. ..................................... 426/603; 426/607
[58] Field of Search ...................... 426/603, 606, 607

[56] References Cited

U.S. PATENT DOCUMENTS

| | | | |
|---|---|---|---|
| 2,143,651 | 1/1939 | Fisher et al. | 426/603 X |
| 2,197,457 | 4/1940 | Werk et al. | 426/603 |
| 3,210,197 | 10/1965 | Galenkamp | 426/607 |
| 3,617,308 | 11/1971 | Graffelman | 426/607 X |
| 3,649,295 | 3/1972 | Bernhart | 426/607 X |
| 3,939,282 | 2/1976 | Carlile et al. | 426/607 X |
| 3,956,522 | 5/1976 | Kattenberg et al. | 426/603 |
| 4,282,265 | 8/1981 | Theuer | 426/607 |

FOREIGN PATENT DOCUMENTS

| | | |
|---|---|---|
| 593336 | 2/1960 | Canada . |
| 153599 | of 0000 | Netherlands . |
| 1245539 | of 0000 | United Kingdom . |

*Primary Examiner*—Robert A. Yoncoskie
*Attorney, Agent, or Firm*—James J. Farrell

[57] ABSTRACT

The invention relates to natural fat blends which are substantially free of hydrogenated and interesterified fats and can be used for producing margarines which are packaged in wrappers. The blends comprise (i) a specific stearin obtained by fractionation of oils and fats derived from fatty acids with an average chain length ranging from 12 to 18 carbon atoms and (ii) oils and fats derived from fatty acids with a chain length ranging from 12 to 14 carbon atoms.

8 Claims, No Drawings

FAT BLEND SUBSTANTIALLY FREE OF HYDROGENATED AND INTERESTERIFIED FATS

The present invention relates to a fat blend which is particularly suitable for incorporation in margarines and low calorie margarines which are to be packaged in wrappers; the fat blend according to the invention can, however, also be used successfully in bakery fats and frying fats.

Fats suitable for such products are described in Dutch patent application 153,599. The margarine fats described in this patent specification have been prepared by forming a mixture of an oil liquid at room temperature on the one hand, in which at least 40% of the fatty acid radicals are derived from linoleic acid, and on the other hand a hard fat mixture obtained by interesterification of a fat mixture consisting of:
(a) coconut, babassu and/or palm kernel fat;
(b) tallow and/or palm oil;
(c) palm oil stearin having at least 80% of saturated acid radicals with a chain length of at least 16 carbon atoms.

From various comparative experiments described in this patent specification it can be deduced that it is an essential condition for the hard fat component to consist of the three aforementioned raw materials and for these three mentioned raw materials to have been subjected to interesterification.

According to the present invention the fat mixture is entirely or substantially free of hydrogenated and interesterified fats and contains on the one hand oils having a slip melting point not exceeding 43° C., and on the other hand one or more stearins of oils or fats having an average chain length of the fatty acid radicals of 12-18 carbon atoms, which stearins have a slip melting point of more than 30° C., the various fats being used in amounts such that, calculated on the fat mixture, the total amount of triglycerides of the type:
(A) tri-saturated glycerides having a chain length of 12-14 carbon atoms is between 7 and 14%;
(B) tri-saturated triglycerides with an average chain length of 16-18 carbon atoms is between 7 and 12%.

Moreover, the weight ratios of the fats to be used are preferably adjusted in such a manner that the amount of triglycerides containing two saturated fatty acid radicals having a chain length of 12-18 carbon atoms besides one unsaturated fatty acid radical having a chain length of 16-18 carbon atoms (component C) is 18-30%.

Oils having a slip melting point not exceeding 43° C. comprise inter alia palm oil, tallow, lard, as well as oils rich in lauric acid, such as coconut oil, palm kernel oil, babassu oil and also the oils that are liquid at room temperature and lower temperatures; the oils of the last-mentioned category, which have at least 40% of fatty acid radicals derived from linoleic acid, are particularly preferred. Suitable oils of the last-mentioned category are for instance soya bean oil, sunflower oil, safflower oil, maize oil, cottonseed oil, etc.

The slip melting point as mentioned in this description is measured as described in Boekenoogen "Analysis and Characterisation of Oils, Fats and Fat Products", Vol. I, 1964, Interscience Publishers, pages 167-170.

Stearins having an average chain length of the fatty acid radicals of 12-18 carbon atoms with a slip melting point of more than 30° C. are preferably derived from lauric acid-containing fats on the one hand and palm oil on the other hand. In particular the fat mixture according to the invention contains both stearins of the first category and of the second category; more particularly stearins of palm kernel oil and palm oil. Suitable stearin fractions can also be obtained by fractionating a fraction of a suitable raw material again; the fraction to be fractionated can—dependent on the triglyceride composition—be a stearin as well as an olein fraction.

The amount of tri-saturated triglycerides having an average chain length of the fatty acids of 12-14 carbon atoms (component A) has appeared to be a very critical factor to make certain that e.g. margarines which have been prepared with the fat mixtures according to the invention are sufficiently hard at temperatures up to about 10° C., for example 7.5° C., which is a requirement, particularly when packaging in wrappers is considered.

The percentage of 7-12% of tri-saturated triglycerides having an average chain length of 16-18 carbon atoms (component B) is essential to achieve a suitable hardness also at a higher temperature, e.g. 20° C., without the melting properties of the emulsions prepared from the fat mixture being adversely affected.

A critical amount of triglycerides derived from two saturated fatty acids having a chain length of 12-18 carbon atoms and one unsaturated fatty acid having a chain length of 16-18 carbon atoms (component C) is of importance, for instance, to impart to the margarine prepared with this fat mixture under the usual processing conditions, an amount of solid phase at body temperature such that the melting properties in the mouth are at least acceptable.

The amount of solid phase is caused by crystallised triglycerides of the fat mixture according to the invention and this amount should come up to critical requirements. As measure for the amount of crystallized fat in a fat mixture a measure of the pulse nuclear magnetic resonance is a suitable method. The way in which the amount of solid phase can be measured is described in "Fette, Seifen, Anstrichmittel", 80, 180-186 (1978).

The amount of solid phase determined in this manner is expressed with the symbol $N_x$; x then indicates the temperarure in °C., at which the measurement was made. Suitable N-values are $N_{10}$ - greater than or equal to 15%, $N_{20}$ - greater than or equal to 6.5%; $N_{30}$ - smaller than or equal to 5%; $N_{35}$ - smaller than or equal to 3%, preferably not higher than 2.5%.

Suitable hardness values are (measured three weeks after production): at 10° C. 900-2100 g/cm$^2$, preferably not exceeding 1600 g/cm$^2$, at 20° C. 100-400 g/cm$^2$, preferably from 100-300 g/cm$^2$.

The amount of triglycerides derived from one saturated fatty acid having a chain length of 12-18 carbon atoms and two unsaturated fatty acids having a chain length of 16-18 carbon atoms (component D) is adjusted to a percentage of 20-35% in order to impart pleasant organoleptical properties to margarine prepared with the fat mixture according to the invention.

The stearin fractions to be used according to the invention can be obtained by wet fractionating the starting material, for example with the aid of solvents, or in the presence of an aqueous solution which contains a small amount of a surfactant, or by dry fractionation.

In a wet fractionation using for example acetone, the fat to be fractionated is dissolved in the solvent and maintained at the fractionated temperature for a number of hours, after which separation of liquid oil and crystallized fat takes place.

In the dry fractionation the starting product is liquefied by heating and thereafter slowly cooled for a number of hours to a temperature at which, according to experience, separation is accomplished between the still higher and lower melting triglycerides in the desired ratio. With palm oil it is for instance usual to cool to a temperature of 18°-20° C. with dry and 20° to 25° C. with wet fractionation, after which, in the case of dry fractionation, the cooled oil is subsequently maintained at a temperature of about 28° C. for 3 to 4 hours. After crystallization the stearin fraction is separated by e.g. filtration. In this way, with dry fractionation, from palm oil a stearin fraction is obtained having an iodine value of 32-36 and a yield of 10-25 wt. %, calculated on the starting amount of palm oil, and with wet fractionation an iodine value of at most 20 and a yield of 7-13%. The conditions under which other raw materials can be fractionated can be simply determined with a single test; these conditions are not critical with respect to the margarine fat according to the invention, because the amount of stearin fraction to be used can be varied according to the amount of the desired triglycerides which are present in the stearing fraction.

Margarine fats according to the invention preferably contain both stearins of palm oil and stearins of palm kernel oil, because the first-mentioned stearins promote crystallization during processing, as a result of which reduced post-hardening during storage is considerably reduced and the latter stearins favourable affect the N-value at 35° C., without detrimentally affecting the hardness on storage. Suitable fat mixtures can be composed of 2-40 wt %, in particular 2-20 wt % of stearins, preferably palm kernel stearin, e.g. in a weight ratio of (1:1) to (8:1); non-fractionated fats containing lauric acid, such as 0 to 25% by weight of fats selected from the group consisting of coconut, palm kernel and babassu oil and particularly from coconut oil and palm kernel oil in an amount of 5-20%; oils rich in both fatty acid radicals having 16 carbon atoms and those having 18 carbon atoms, such as palm oil, tallow and lard, in an amount varying from 25-65 wt %, preferably 30-45 wt %; oils liquid at room temperature, e.g. vegetable oils such as sunflower oil, safflower oil etc. in an amount varying between 20 and 50 wt %, in particular in an amount of 30-50 wt %. Margarines and low-fat spreads can be produced by emulsifying the fat mixtures, according to the invention, with water and subjecting the emulsion to working and cooling under conditions, which lead to a product having the desired plasticity.

The invention will now be illustrated in the following examples.

EXAMPLES I-VIII

Fat mixtures were prepared by mixing various raw materials, as shown in Table A. In this Table the N-values at various indicated temperatures are given, as well as the triglyceride compositions of components A, B, C and D.

With these fat mixtures margarines were prepared as follows:

The fat mixture was mixed with an aqueous phase in the ratio 82:18 and pumped into a scraper cooler of the Votator A unit type at 45° C.; on leaving it, the temperature was 17° C. The emulsion at this temperature subsequently passed a crystallizer, i.e. a resting tube provided with a stirrer, in which the temperature rose to 20° C. Subsequently the emulsion passed a second Votator A-unit and was cooled to 6° C. at which temperature the emulsion was introduced into an unstirred resting tube, in which further crystallization took place and the product got the consistency suitable for margarine to be packaged in wrappers and a temperature of 10° C.

The hardness values mentioned in Table A were measured on the margarine.

The stearins used were prepared as follows:

WET-FRACTIONATED PALM OIL STEARIN

The fat to be fractionated was dissolved in acetone (weight ratio fat/acetone 1:5). The solution was poured into a funnel provided with a cooling jacket and stirrer and slowly cooled to the fractionation temperature of 23° C. The mixture was kept at this temperature for two hours and subsequently filtered through a Büchner filter. The residue was washed twice with acetone, after which the acetone was distilled off from both fractions.

DRY-FRACTIONATED PALM KERNEL STEARIN

The fat was heated to 60° C., poured into a vessel provided with a cooling jacket and stirrer and subsequently slowly cooled in two steps to the fractionation temperature of 28° C. Thereafter a small amount of fat was added to start the recrystallization, which was continued for four hours, after which the mixture was filtered through a Büchner filter.

EXAMPLES IX-X

Examples I-VIII were repeated, using however dry-fractionated palm oil stearin and other raw material in weight ratios as indicated in Table B, which Table further shows the results obtained. The palm oil stearin used was prepared like the palm kernel stearin in Examples I-VIII, with this difference that the fractionation was now carried out at a temperature of 18° C.

TABLE A

| | Example No. | I | II | III | IV | V | VI | VII | VIII |
|---|---|---|---|---|---|---|---|---|---|
| Fat mixture in wt. % | Sunflower oil | 32.5 | 35 | 37.5 | 40 | 40 | 42.5 | 45 | 45 |
| | Palm oil | 42.5 | 37.5 | 45 | 30 | 35 | 32.5 | 32.5 | 32.5 |
| | Wet-fractionated palm oil stearin | — | 2.5 | 2.5 | 5 | 5 | 5 | 2.5 | 2.5 |
| | Dry-fractionated palm oil stearin | 5 | 5 | 15 | 5 | 15 | 10 | 5 | 20 |
| | Palm kernel oil | 20 | 20 | — | 20 | 5 | 10 | 15 | — |
| N-values | N7.5(%) | 34.9 | 35.5 | 34.7 | 34.9 | 37.0 | 34.2 | 29.1 | 33.5 |
| | N10 | 28.2 | 29.6 | 29.3 | 28.0 | 31.1 | 28.3 | 23.8 | 28.0 |
| | N20 | 7.2 | 8.7 | 10.8 | 9.3 | 11.2 | 9.6 | 6.7 | 8.9 |
| | N30 | 2.3 | 3.4 | 4.8 | 4.0 | 4.9 | 4.7 | 2.8 | 2.8 |
| | N35 | 0.4 | 1.7 | 2.3 | 1.8 | 2.7 | 2.4 | 1.7 | 1.3 |
| Hardness values | After 3 weeks at 10° C. | 1490 | 1540 | 1950 | 1330 | 1825 | 1500 | 915 | 1140 |

TABLE A-continued

| Example No. | I | II | III | IV | V | VI | VII | VIII |
|---|---|---|---|---|---|---|---|---|
| at 20° C. | 160 | 160 | 205 | 145 | 345 | 240 | 110 | 145 |
| Triglyceride percentages of the main components | | | | | | | | |
| Component A | 13.0 | 13.0 | 10.5 | 13.0 | 12.9 | 11.7 | 10.6 | 14.0 |
| Component B | 9.4 | 10.3 | 9.0 | 11.0 | 10.5 | 10.2 | 8.8 | 8.7 |
| Component C | 28.3 | 27.0 | 25.6 | 24.0 | 22.4 | 22.5 | 23.3 | 19.6 |
| Component D | 26.7 | 25.5 | 24.9 | 26.0 | 26.1 | 26.1 | 27.0 | 26.9 |

TABLE B

The hardness of margarines was measured by the method of Haighton as described in J.A.O.C.S., 36 (1959) pp. 345-348.

| Example Nr. | | IX | X |
|---|---|---|---|
| Fat mixture in wt. % | Sunflower oil | 20 | 25 |
| | Palm oil | 55 | 65 |
| | Dry-fractionated palm oil stearin | — | — |
| | Dry-fractionated palm kernel oil st. | 15 | 10 |
| | Coconut oil | 10 | — |
| N-values | N0 (%) | 55.3 | 48.8 |
| | N10 | 42.5 | 38.2 |
| | N20 | 14.5 | 18.3 |
| | N35 | 2.1 | 2.0 |
| | N40 | 0 | 0.2 |
| Hardness values | | | |
| After 3 weeks at 10° C. | | 2050 | 1500 |
| at 20° C. | | 290 | 155 |
| Triglyceride percentages of the main components | | | |
| component A | | 11.5 | 7.1 |
| component B | | 11.6 | 8.6 |
| component C | | 29.6 | 29.3 |
| component D | | 27.3 | 32.8 |

We claim:

1. Fat blend, which is substantially free of hydrogenated and interesterified fats, comprising:
   (i) 60 to 98% of an oil or fat having a slip melting point not exceeding 43° C.; and
   (ii) 2 to 40% of a stearin of oils or fats having an average chain length of the fatty acid radicals of 12 to 18 carbon atoms, said stearin having a slip melting point exceeding 30° C.;
   in which fat blend the proportion of glycerides having trisaturated fatty acids with a chain length of 12 to 14 carbon atoms ranges from 7 to 14% and the proportion of glycerides having trisaturaed fatty acids with an average chain length of 16 to 18 carbon atom ranges from 7 to 12%; and
   which fat blend has an amount of solid phase as determined by pulsed nuclear magnetic resonance of:

$N_{10}$ greater than or equal to 15%
   $N_{20}$ greater than or equal to 6.5%
   $N_{30}$ smaller than or equal to 5%
   $N_{35}$ smaller than or equal to 3%.

2. Fat blend according to claim 1 further comprising triglycerides having two saturated fatty acids with a chain length of 12 to 18 carbon atoms and one unsaturated fatty acid with a chain length of 16–18 carbon atoms in amounts from 18 to 30%.

3. Fat blend according to claim 1, further comprising triglycerides having one saturated fatty acid with a chain length of 12 to 18 carbon atoms and two unsaturated fatty acids with a chain length of 16 to 18 carbons in amounts from 20 to 35%.

4. Fat blend according to claim 1, in which the oil or fat having a slip melting point not exceeding 43° C. is selected from the group consisting of palm oil, tallow, lard, oils which are rich in lauric acid and oils which are liquid at room temperature.

5. Fat blend according to claim 1, in which the stearin consists of palm kernel oil and palm oil stearin.

6. Fat blend according to claim 1, which comprises
   (a) 2–40% by weight of stearins
   (b) 0–25% by weight of non-fractionated lauric acid containing fats selected from the group consisting of coconut-, palm kernel- and babassu oil
   (c) 25–65% by weight of non-fractionated oils which are rich in fatty acids of a chain length ranging from 16 to 18 carbon atoms
   (d) 20–50% by weight of an oil which is liquid at room temperature.

7. Fat blend according to claim 6, which comprises:
   (a) 2–20% by weight of stearins
   (b) 5–20% by weight of non-fractionated lauric acid-containing fats
   (c) 30–45% by weight of non-fractionated oil with a relatively high content of fatty acids having a chain length of 16 to 18 carbon atoms
   (d) 30–50% of an oil which is liquid at room temperature.

8. Margarines and low fat spreads in which the fat phase contains a fat blend as claimed in claim 1.

* * * * *